United States Statutory Invention Registration [19]

[11] Reg. Number: H922

Kirkland et al. [43] Published: May 7, 1991

[54] METHOD FOR ANALYZING MATERIALS USING X-RAY FLUORESCENCE

[75] Inventors: Johnny P. Kirkland, Shoreham, N.Y.; Wm. Timothy Ehm, Alexandria, Va.; John V. Gilfrich, Bethesda, Md.

[73] Assignee: United States of America, Washington, D.C.

[21] Appl. No.: 227,023

[22] Filed: Aug. 1, 1988

[51] Int. Cl.[5] ..... G01N 23/223

[52] U.S. Cl. ..... 378/45; 378/49

[58] Field of Search ..... 378/44, 45, 47, 49, 378/119

[56] References Cited

U.S. PATENT DOCUMENTS

| | | | |
|---|---|---|---|
| 3,030,512 | 4/1962 | Harker | 378/45 |
| 3,102,952 | 9/1963 | Hendee et al. | 378/45 |
| 3,150,261 | 9/1964 | Furbee et al. | 378/47 |
| 3,198,944 | 8/1965 | Furbee | 378/47 |
| 4,080,171 | 3/1978 | Sano et al. | 378/47 |
| 4,134,012 | 1/1979 | Smallbone et al. | 378/47 |
| 4,748,636 | 5/1988 | Osada et al. | 378/119 |

FOREIGN PATENT DOCUMENTS

| | | | |
|---|---|---|---|
| 0178139 | 11/1982 | Japan | 378/45 |
| 8001718 | 8/1980 | PCT Int'l Appl. | 378/45 |

OTHER PUBLICATIONS

P. A. Lee et al., *Extended X-Ray Absorption Fine Structure—Its Strengths and Limitations as a Structural Tool*, Review of Modern Physics, vol. 53, No. 4, (Oct. 1981).

*Primary Examiner*—Linda J. Wallace

*Attorney, Agent, or Firm*—Thomas E. McDonnell; Edward F. Miles

[57] ABSTRACT

A method of identifying the presence, and amount, of elemental constituents in a material. The method uses an apparatus known for use in measuring extended x-ray absorption fine structure, and adapts it to the measurement of x-ray appearance potential in a manner to yield both qualitative and quantitative information about the elemental constituents of the material. The source of x-rays can be a synchrotron, which, because of its high power output, increases the speed and sensitivity of the measurements, permitting the use of less sensitive x-ray detectors to yield statistically significant data.

1 Claim, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR ANALYZING MATERIALS USING X-RAY FLUORESCENCE

BACKGROUND

The invention pertains broadly to x-ray techniques used to analyze materials, and in particular techniques based on x-ray fluorescence.

X-rays have for some time been used to probe and characterizer materials, in particular to probe a material's atomic structure by x-ray absorption fine structure analysis. By this technique, a sample is exposed to a monochromatic x-ray beam, and the absorption of the beam measured by comparing the beam's input and throughput intensities (i.e. input and throughput power). By repeating this for different energies (frequencies) of x-rays, one generates the material's absorption spectrum, whose signature is characteristic of the atomic structure within the material. Because an x-ray beam that completely traverses the sample is necessary for this technique, the technique is limited to use with thin samples. This limitation led to the development of another system useful with thicker, more absorptive, samples, in which fluorescence induced by a monochromatic x-ray beam is measured over a spectrum of frequencies to map out a fine structure curve for a sample. Heretofore, however, the use of such schemes have been limited to identifying fine structure, and other techniques used to identify directly the specific elemental constituents of a sample (i.e. to do qualitative elemental analysis) and the amount of these elements present (quantitative elemental analysis). Additionally, because detection of fluorescent photons is, in effect, a counting process, the lower the power of the exciting x-ray beam the fewer the number of resultant fluorescences generated in response, hence the poorer the detection statistics, and the longer the detection process must be run in order to generate useful data. To decrease this time, one must either increase the intensity (power) of the exciting x-ray beam, or increase the sensitivity of the fluorescence detector, the latter effectively meaning that one must use a more sensitive, i.e. complicated and expensive, detector.

SUMMARY OF THE INVENTION

Accordingly, an object of the invention is to enable one to do quantitative elemental analysis using x-ray fluorescence, as well fine structure analysis.

Another object of the invention is to enable one to do the foregoing simply, and with one apparatus.

Another object of the invention is to enable one to do the foregoing with increased sensitivity.

Another object of the invention is to enable one to do the foregoing with less complicated and expensive detectors.

In accordance with these and other objects made apparent hereinafter, the invention most broadly is a method of identifying at least one constituent of a material by exposing a sample of the material to a substantially monochromatic x-ray beam of preselected frequency for a preselected time, measuring the amount of fluorescence produced by the material during this preselected time responsive to the x-ray beam, measuring the amount of energy delivered to the material in the preselected time, and repeating these steps for x-ray beams of different frequencies a sufficient number of times to identify a large jump in fluoroescence indicative of an absorption edge. The energy at which such an absorption edge occurs identifies the specific element in the sample that has produced the edge. This is, in effect, x-ray appearance potential spectroscopy. Logically, the amount of absorption at the edge should be proportional to the amount of material present, which the inventors have verified. Therefore, in accordance with another feature of the invention, the magnitude of the edge jump is measured, and this information used to infer the quantity of the element present in the sample.

The invention is more fully understood from the following detailed description of a preferred embodiment, it being understood, however, that the invention is capable of extended application beyond the precise details of the preferred embodiment. Changes and modifications can be made that do not affect the spirit of the invention, nor exceed its scope, as expressed in the appended claims. Accordingly, the invention is described with particular reference to the accompanying drawings, wherein:

DETAILED DESCRIPTION

Figure 1:
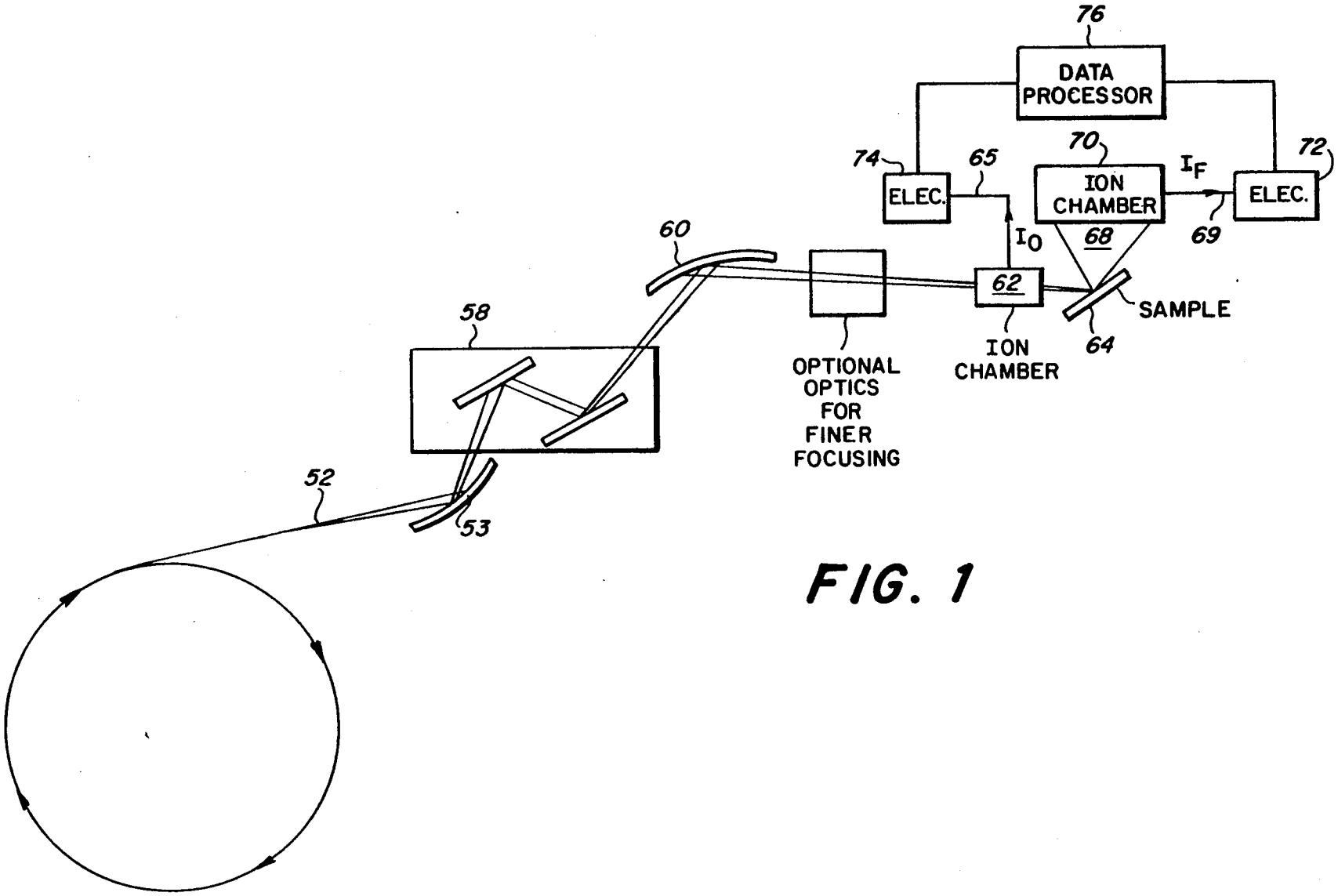
FIG. 1 is a schematic representation of an apparatus for practicing the invention.

FIG. 1 shows an apparatus for making x-ray fluorescence measurements. The apparatus has synchrotron storage ring 50 which generates a polychromatic beam of x-rays 52 onto collimating mirror 53, then onto crystal monochromator 58 and focusing mirror 60. A synchrotron is preferred as the source of x-rays because of the high intensity that it can generate. Use of a synchrotron enables one to take statistically significant data in much shorter times, and use considerably less sophisticated and sensitive sensors. One could, however, dispense with these advantages and use more conventional x-ray sources, such as x-ray tubes (especially a rotating anode tube). The monochromatic output of monochromator 58 is directed onto focusing optics 60, and thence onto photon detector 62. Photon detectors such as 62 (and detector 70, discussed below) are preferably gas ion chambers or silicon PIN diodes, and are conventional in the field and well understood by those skilled in the art. The particular gases used in such ion detectors are commonly argon, nitrogen, and/or oxygen; the choice of a particular gas, or mix of gases, depends largely on the frequency of x-ray used, and the absorption characteristics of the particular gases. Choice of such gases for a specific application is, again, well within the competence of one skilled in the art once instructed in the particulars of the application. The x-ray optics shown in FIG. 1, i.e. mirrors 53 and 60, crystal monochromator 58, and lens 60, are per se conventional and well understood by those skilled in the art. Ion chamber 62 absorbs a small portion of the energy of the x-ray beam and outputs a signal proportional to the power of the beam. The output of detector 62 responsive to the x-ray beam is denominated by $I_o$ (indicating a current proportional to the power input into the apparatus), which is conveyed by lead 65 to conventional electronics 74 for processing into a form compatible with conventional data processor 76. The x-ray beam traversing detector 62 impinges upon sample 64. If of appropriate energy, the x-rays are absorbed by sample 64, and secondary radiation is emitted as fluorescence, which is collected and measured by detector 70. The output current of detector 70 responsive to the fluorescence 68 is denominated by $I_F$ (for current resulting from fluorescence), and is conveyed by lead 69 to conventional electronics 72 for processing to a form compatible with data processor 76. Preferably, processor 76 is a dedicated computer, which eases data recording and reduction considerably, but this does not preclude observing and noting by hand the data measured by detectors 62 and 70, and reducing these data by hand, or other equivalent methods.

Figure 2:
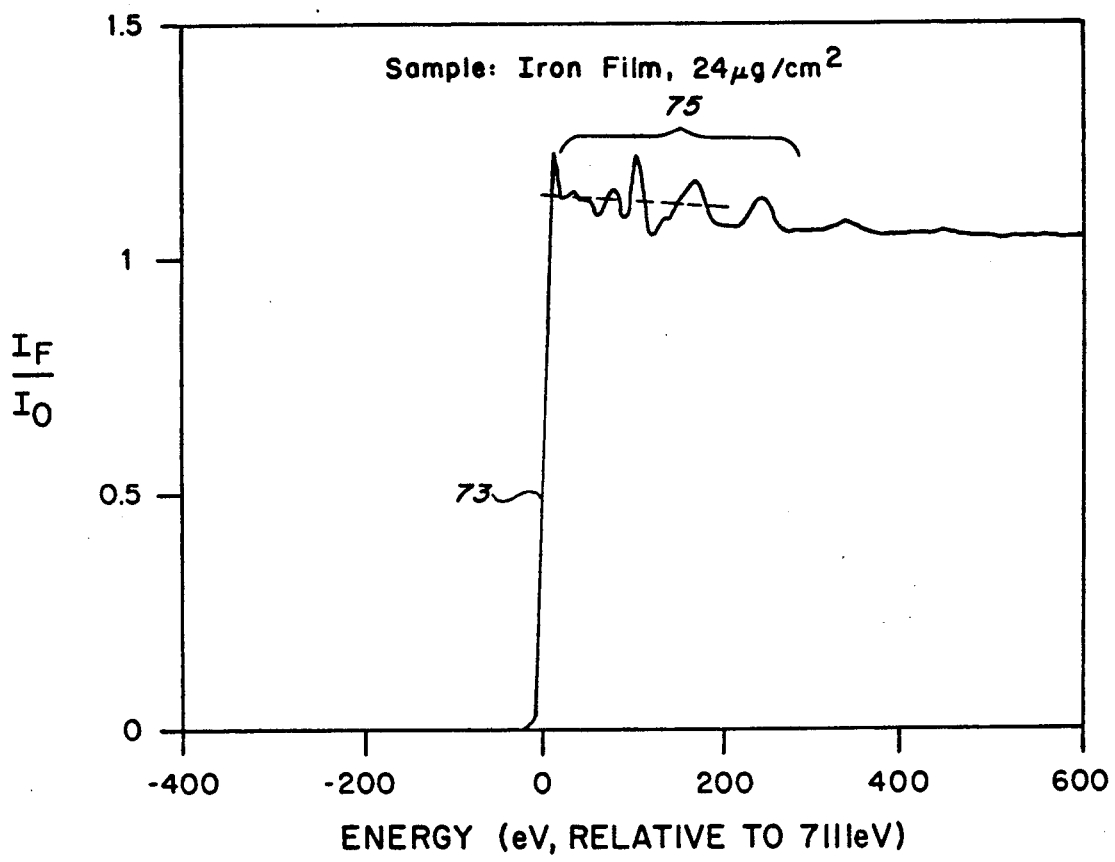
FIG. 2 is a graphical representation of the data produced by the invention, illustrating the reduction of the data.

In operation, one uses crystal monochromator 58 to selectively vary the energy (frequency) of the monochromatic x-ray beam over an energy spectrum. For each beam frequency, sample 64 is excited for a preselected time, and detector 70 measures the amount of fluorescence emitted into solid angle 68 during this preselected time responsive to the beam. Should sample 64 contain an element having an absorption edge within the spectrum, the magnitude of fluorescence will jump at the absorption edge, the magnitude of which jump is proportional to the the amount of the element present. (In FIG. 2 the absorption edge energy is indicated by numeral 73.) Prior calibration of the apparatus against known standards enables one to calculate the absolute amount of the element present, or it can be calculated from first principles. FIG. 2 shows data taken on a sample containing iron, and shows iron's K-absorption edge at 7111 ev. (The magnitude of fluorescence $I_F$ is normalized in the graph of FIG. 2 to the magnitude $I_o$ because at present x-ray generators cannot produce constant power outputs over any significant energy range.) At energies above 7111 ev, the magnitude of fluorescence varies to produce a fine structure signature of the material, as illustrated by numeral 75.

The invention has been shown in what is considered to be the most practical and preferred embodiment. It is recognized, however, that obvious modifications may occur to those skilled in the art. Accordingly, the scope of the invention is to be discerned solely by reference to the appenced claims, wherein:

What is claimed and desired to be secured by Letters Patent of the United States is:

1. A method of identifying at least one elemental; constituent of a material sample, said method comprising steps for:

(a) exposing said sample for a preselected time to a substantially monochromatic x-ray beam of preselected frequency;

(b) measuring the amount of fluorescence emitted by said sample into a preselected solid angle during said preselected time responsive to said step for exposing;

(c) measuring the amount of energy delivered to said sample in said preselected time by step (a);

(d) varying the frequency of said monochromatic x-ray beam;

(e) repeating steps (a) through (d) a sufficient number of times to identify an absorption edge transition of said elemental constituent of said sample;

(f) measuring the change of magnitude of said amount of fluorescence at said absorption edge;

(g) using said change of magnitude to calculate the amount of said elemental constituent of said sample.

* * * * *